Patented Feb. 23, 1932

1,846,806

UNITED STATES PATENT OFFICE

RUDOLF HEPPNER, OF SCHONEBERG, NEAR BERLIN, GERMANY, ASSIGNOR TO JOSEF HAUSEN, OF BERLIN-FRIEDENAU, GERMANY

ABSORBENT FOR ACETYLENE GAS

No Drawing. Application filed January 18, 1927, Serial No. 161,963, and in Germany January 20, 1926.

My invention relates to a process of increasing the safety of absorbent materials used for storing explosive or combustible gases.

It is well known that explosive or combustible gases in the liquid, compressed or dissolved state, for instance acetylene dissolved in acetone, are articles of commerce. To render the gases contained in steel bottles or other containers comparatively safe against explosions which might be caused by the transmission of heat to or local heating of the wall of the bottle, absorbent or porous materials are employed which fill up the container to its full capacity.

The porous or absorbent materials which may be used are heaped, rammed or cast materials of an inorganic or organic nature. It has been ascertained that organic materials, such for example as kapok, cotton, cellulose, saw dust, animal hair, silk, elder-pith, peat, horse-dung and the like in the natural state are not capable of offering an absolute protection against the danger of an explosion in case of back firing or local heating of the wall of the bottle.

By extensive experiments it has been ascertained that in case of a decomposition of the acetylene in the gas container initiated by external conditions and occurring under development of a flame a low temperature carbonization and decomposition of the organic materials takes place owing to the high temperature developed.

The once initiated and gradually progressing low temperature carbonization process causes at the same time a further decomposition of the acetylene located at some distance from the center of decomposition and contained in the still unchanged absorbent material. This process is accompanied by a gradual rise of the temperature and the pressure which ultimately results in the complete destruction of the container.

It has been attempted to eliminate this drawback by mixing inorganic materials, such as kieselguhr (diatomaceous or infusorial earth), in certain proportions with the organic materials. Experiments have, however, shown that this admixture is not successful in every case.

It has also been suggested to protect the absorbent materials against carbonization by treating them with fireproof impregnating agents, for instance waterglass or resinous soaps in combination with calcium-, copper- and zinc-salts, and enveloping or enclosing the material in these impregnating agents. This process of silicification or precipitation of solid fireproof inorganic substances upon the filling or absorbent material is merely based upon the fact that the organic material is protected in a purely mechanical manner by these fireproof substances or when these are heated by the inorganic substances remaining behind.

My invention is based upon the new idea of preventing the progressive decomposition of the acetylene by treating the absorbent materials with inorganic or organic salts which become decomposed and completely volatilized at high temperatures and thus effect the protection thermo-chemically or by the evolution of decomposition retarding gases. The action of these agents may be accounted for by the fact that they become gasified or decomposed by the high temperatures developed during the decomposition of the acetylene, consume heat in this process and thus reduce the temperature necessary for the decomposition of the gas, for instance acetylene.

In the same manner a decomposition retarding action is caused by the evolution of gases which under these circumstances retard decomposition such as nitrogen, carbonic acid gas, ammonia and so on whereby a displacement occurs of the decomposition limits of the gas stored in the minute pores of the absorbent material, as experiments have clearly proved. The reduction of the temperature prevents subsequently the progress of the carbonization and thus the destruction of the receptacle. Particularly suitable agents for this purpose are inorganic or organic compounds or salts which are themselves volatile or which act to retard decomposition by the evolution of heat consuming, fire-choking gases, as for instance sulphate, oxalate or carbonate of ammonia and so on.

The treatment of the absorbent materials with the bodies stated may be carried out in a very simple manner and so that an intimate mixture of the added bodies with the filling or absorbent materials is obtained by, for instance, saturating the filling materials with solutions of these additional substances and drying them, whereby a uniformity of the distribution of the additional substances in the absorbent material as well as a perfect homogeneity is attained, which is of the greatest importance for the mixing of these substances with the absorbent materials in regard to the reliability of the mass.

As a further safety factor the continuous homogeneity and density of the masses employed is necessary. This was attained up to now by an addition of kieselguhr. Further means are: pumice-stone meal, pulverized coal, metal oxides, as well as natural earths in sintered or non-sintered state and so on. The last named additions, however, do not show the required homogeneity in the composition of the mass from the beginning as the constituents tend to separate and thus give cause for the formation of dangerous cavities in the receptacles. As extensive experiments proved the separation may be effectively prevented by adding to the inorganic or organic masses apt to separate suitable binding agents in the form of adhesives, such as oils, fats, resins and the like (paraffines, natural and artificial resins, soaps and the like), which are not subsequently changed and are insoluble in the gas dissolving agent. In this way a transmission of the explosion to the acetylene contained in the bottle is rendered impossible by the now effected homogeneity of the mass corresponding with the action of the hitherto customary kieselguhr.

Various changes and modifications may be made without departing from the spirit and scope of my invention and I desire, therefore, that only such limitations be placed thereon as are imposed by the prior art.

I claim as my invention:—

1. Filler material for the storage of acetylene comprising a porous mass impregnated with a normally stable derivative of ammonium which decomposes below the decomposition temperature of acetylene to liberate a gas which effectively prevents decomposition of said acetylene, said derivative being present in an amount sufficient to prevent decomposition.

2. Filler material for the storage of acetylene comprising a porous mass impregnated with ammonium carbonate.

3. Filler material for the storage of acetylene, comprising a porous mass impregnated with ammonium oxalate sufficient in amount to prevent decomposition, and a material for rendering said impregnated porous mass homogeneous composed of a substance selected from the class consisting of powdered pumice, coal dust and natural earths other than kieselguhr and an adhesive selected from the class consisting of oils, fats and resins, chemically uncombinable with acetylene.

4. Filler material for the storage of acetylene, comprising a porous mass impregnated with ammonium sulfate sufficient in amount to prevent decomposition, and a material for rendering said impregnated porous mass homogeneous composed of a substance selected from the class consisting of powdered pumice, coal dust and natural earths other than kieselguhr and an adhesive selected from the class consisting of oils, fats and resins, chemically uncombinable with acetylene.

In testimony whereof I have affixed my signature.

RUDOLF HEPPNER.